(12) United States Patent
Swanson

(10) Patent No.: US 6,538,796 B1
(45) Date of Patent: Mar. 25, 2003

(54) MEMS DEVICE FOR SPACECRAFT THERMAL CONTROL APPLICATIONS

(75) Inventor: Theordore D. Swanson, Columbia, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/541,680

(22) Filed: Mar. 31, 2000

(51) Int. Cl.[7] ............................................. G02B 26/00
(52) U.S. Cl. ...................................... 359/291; 359/290
(58) Field of Search ................................ 359/227, 232, 359/236, 290, 291, 296, 298, 224, 225, 842, 849, 288

(56) References Cited

U.S. PATENT DOCUMENTS

| | | | | |
|---|---|---|---|---|
| 3,872,911 A | * | 3/1975 | Janes | 160/1 |
| 4,825,927 A | * | 5/1989 | Woodrow | 160/1 |
| 5,745,281 A | * | 4/1998 | Yi et al. | 359/290 |
| 6,248,509 B1 | * | 6/2001 | Sanford | 430/396 |
| 6,268,908 B1 | * | 7/2001 | Bula et al. | 355/71 |
| 6,299,462 B1 | * | 10/2001 | Biegelsen | 439/81 |
| 6,433,463 B1 | * | 8/2002 | Lal et al. | 310/328 |
| 2002/0003920 A1 | * | 1/2002 | Flanders | 385/19 |

OTHER PUBLICATIONS

David G. Gilmore, Satellite Thermal Control Handbook, 1994.

* cited by examiner

Primary Examiner—Georgia Epps
Assistant Examiner—William Choi
(74) Attorney, Agent, or Firm—Keith L. Dixon; Diana M. Cox

(57) ABSTRACT

A micro-electromechanical device that comprises miniaturized mechanical louvers, referred to as Micro Electro-Mechanical Systems (MEMS) louvers are employed to achieve a thermal control function for spacecraft and instruments. The MEMS louvers are another form of a variable emittance control coating and employ micro-electromechanical technology. In a function similar to traditional, macroscopic thermal louvers, the MEMS louvers of the present invention change the emissivity of a surface. With the MEMS louvers, as with the traditional macroscopic louvers, a mechanical vane or window is opened and closed to allow an alterable radiative view to space.

10 Claims, 10 Drawing Sheets

FIG. 10(a)  FIG. 10(b)  FIG. 10(c)
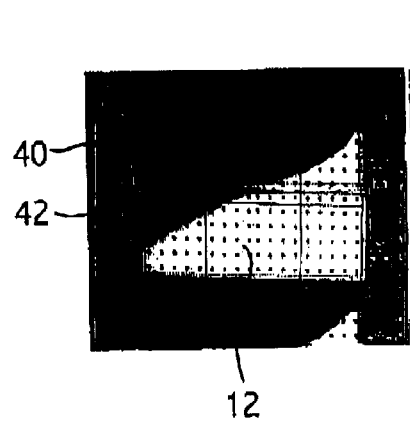
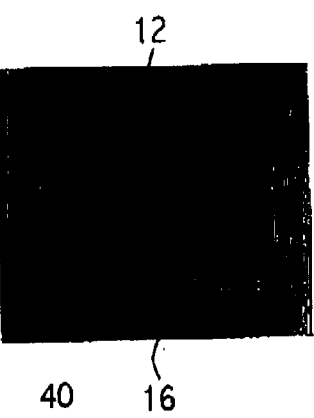
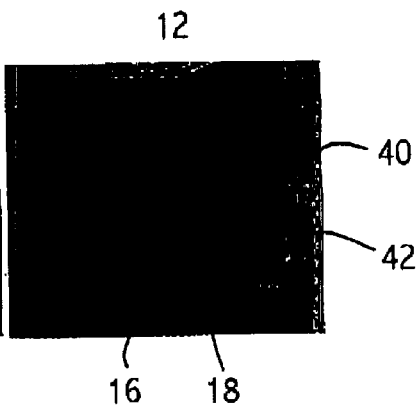
FIG. 11(a)  FIG. 11(b)  FIG. 11(c)
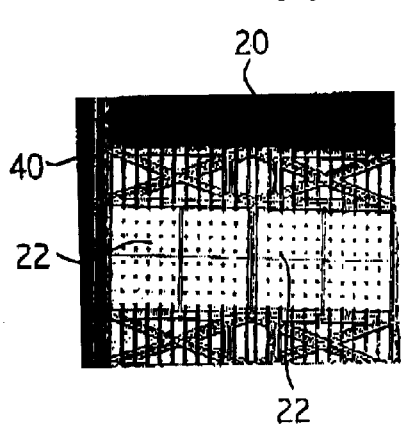
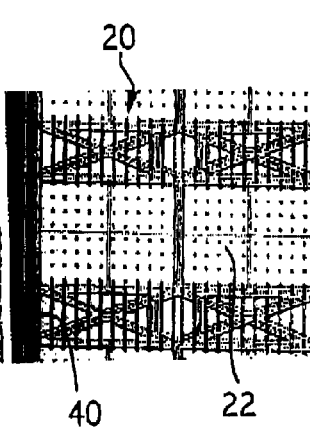
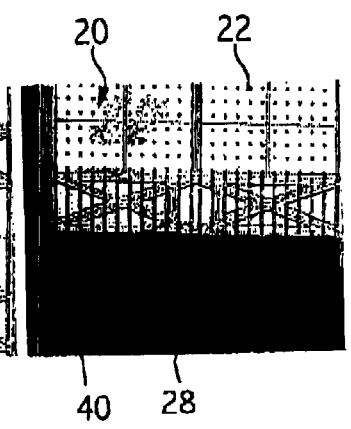
FIG. 12(a)  FIG. 12(b)  FIG. 12(c)
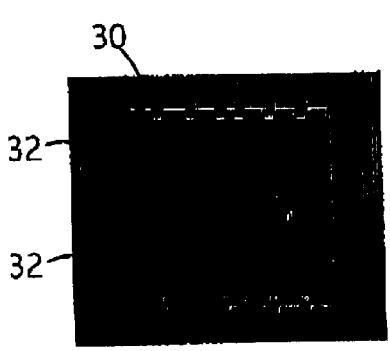
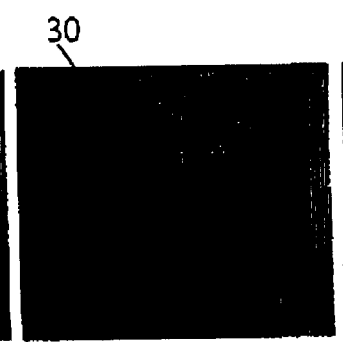
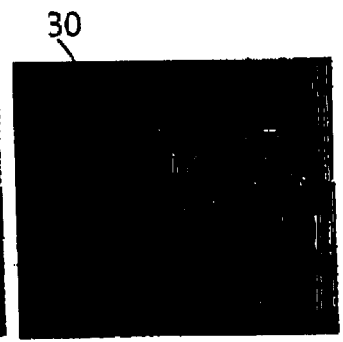

MEMS DEVICE FOR SPACECRAFT THERMAL CONTROL APPLICATIONS

BACKGROUND OF THE INVENTION

1. Field of the Invention

The present invention is directed to thermal control of spacecraft and/or instruments, and, more particularly, to the use of miniaturized mechanical louvers to control the temperature of a spacecraft and/or instruments.

2. Description of the Related Art

All spacecraft and the instruments they support require an effective thermal control mechanism in order to operate as designed and achieve their expected lifetimes. In an increasing number of satellites, optical alignment and calibration require a strict temperature control. Traditionally the thermal design, an iterative process, is part of the spacecraft design determined by all the subsystems and instruments. Heat load levels and their location on the spacecraft, equipment temperature tolerances, available power for heaters, view to space, and other such factors are critical to the design process. Smaller spacecraft with much shorter design cycles and fewer resources such as heater power, volume, and available radiator surface area, require a new, more active approach. The relatively low mass of smaller spacecraft result in larger temperature variations as loads and sink temperatures change, unless some means of modulating their heat rejection rate is provided.

A spacecraft must normally be within a reasonable thermal equilibrium. As the heat load and/or thermal sink changes, it is often necessary to modify the heat rejection rate in some controlled fashion.

A number of active methods which vary the heat rejection rate in a controlled fashion are commonly used to maintain a reasonable thermal equilibrium. One such method is to cold bias the spacecraft and use simple electrical resistance make-up heaters to control the temperature.

However, this can require considerable electrical power, which the spacecraft may not have available at all times.

Another approach is to employ a radiator connected to the heat dissipating equipment with variable conductive heat pipes, capillary pumped loops, or loop heat pipes. This approach is effective but adds weight, cost and complexity. In addition there are ground testing issues with heat pipes.

Yet another approach is to use mechanical louvers that can open to expose a radiative surface and close to hide it. Mechanical louvers have frequently been used for spacecraft and instrument thermal control purposes. These devices typically consist of parallel or radial vanes, which can be opened or closed to expose an underlying surface and thus vary the effective emissivity. While functional, traditional mechanical louvers are bulky, expensive, subject to damage, and require significant thermal analysis to evaluate the effect of different sun angles. Louver assemblies are explained in *Satellite Thermal Control Handbook*, David G. Gilmore (editor), The Aerospace Corporation Press, El Segundo, Calif. 1994, pp. 4–99 through 4–103.

In order to meet current and future space science goals, miniaturized spacecraft with greatly reduced size and mass, short design and build cycles, and restricted resources (power, command, control, etc.) are required. Spacecraft in this very small size range, 10 to 20 kg, will require smaller thermal control subsystems. Their low thermal capacitance will subject them to large temperature swings when either the heat generation rate or the thermal sink temperature changes. The ST5 Nanosat Constellation Trailblazer mission, for example, has a requirement to maintain thermal control through extended earth shadows, possibly over 2 hours long.

All spacecraft rely on radiative surfaces to dissipate waste heat. These radiators have special coatings, typically with low absorptivity and a high infrared emissivity, that are intended to optimize performance under the expected heat load and thermal sink environment. As discussed above, given the dynamics of the heat loads and thermal environment it is often necessary to have some means of regulating the heat rejection rate of the radiators in order to achieve proper thermal balance. The concept of using a specialized thermal control coating or surface which can passively or actively adjust its effective emissivity in response to such load/environmental sink variations is a very attractive solution to these design concerns. Such a system would allow intelligent control of the rate of heat loss from a radiator. Variable emissivity coatings offer an exciting alternative that is uniquely suitable for micro and nano spacecraft applications.

Variable emittance thermal control coatings change the effective infrared-red emissivity of a thermal control surface to allow the radiative heat transfer rate to be modulated upon command. Two known variable emittance thermal control technologies currently under development include electrochromic devices and electrophoretic devices. Both of these technologies are chemically based and are currently under development. Their suitability for the harshness of the space environment (i.e., degradation from radiation, atomic oxygen reactions, temperature extremes, etc.) is not yet established. In addition, reaction rates at cold temperatures may be an issue.

For electrochromic devices, the emittance modulation is achieved using crystalline or semi-crystalline electrochromic materials whose reflectance can be tuned over a broad wavelength (2 to 40 microns) in the infrared. The electrochromic process is a reversible, solid-state reduction-oxidation (redox) reaction. These materials become more reflective as the concentration of an inserted alkali metal (typically lithium) increases. This change is due to an increase in the electron free density, which causes the material to undergo a controlled transition between an IR transparent wide gap semiconductor and an IR reflective material. The electrochromic material is typically sandwiched between ITO electrical grids and is also in contact with an ion-conducting layer that contains the alkali metal. When a small bias voltage (typically +/−1 VDC) is applied, the alkali ions shuttle to one side or the other, thus changing the effective emissivity of the surface.

Electrophoretic devices involve the movement of suspended particles (i.e., very small flakes) through a fluid under the application of a small electrical field. The particles carry electric charges that are acted upon by this field thus causing their movement through the fluid medium. This medium is highly absorptive. The particles are made of, or coated with, a material that has a high reflectivity. When an electric field is applied the flakes are attracted to the electrode and align themselves with their faces parallel to the surface, thus displacing the absorptive fluid medium. They overlap and form an essentially flat surface that is both a high reflector and spectrally reflective. When the electric field is reversed the flakes are drawn to the electrode on the other side of the highly absorbing fluid medium. The exposed surface thus becomes highly absorptive. This process has been demonstrated to be reversible and should be repeatable for thousands of cycles.

For the reasons stated above, both the conventional and emerging, chemically based variable emissivity technologies for thermal regulation of spacecraft have significant problems.

SUMMARY OF THE INVENTION

It is an object of the present invention to overcome the above-mentioned problems related to thermal regulation.

It is a further object of the present invention to provide thermal control for small, micro, or nano spacecraft.

It is another object of the invention to provide finer gradations in the regulation of effective emissivity and effective absorptivity of a surface, independent of sun angle.

Yet a further object of the invention is to provide a thermal control device rugged enough to withstand the demands of launch and spaceflight.

A micro-electromechanical device of the present invention comprises miniaturized mechanical louvers, referred to as Micro Electro-Mechanical Systems (MEMS) louvers of the present invention. The MEMS louvers of the present invention are another form of a variable emittance control coating and employ micro-electromechanical technology.

In a function similar to traditional, macroscopic thermal louvers, the MEMS louvers of the present invention change the emissivity of a surface. With the MEMS louvers of the present invention, as with the traditional, macroscopic louvers, a mechanical vane or window is opened and closed to allow an alterable radiative view to space.

Micro-machining techniques allow the generation of arrays of such MEMS louvers with feature sizes on the order of micrometers. This approach to variable emissivity control offers distinct advantages over traditional mechanical louvers with regard to size, weight, mechanical complexity, redundancy, and cost. In addition, the thermal analysis effort is simpler since the dependence on sun angle can be eliminated by having MEMS louvers face all directions. Moreover, the MEMS louvers of the present invention are more rugged, less costly, lighter, suitable for a wider range of applications, and are more specifically suitable for micro and nano spacecraft than the significantly larger, traditional louvers.

The above objects can be attained by a system that comprises the above-mentioned MEMS louvers of the present invention.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 10(a), 10(b), and 10(c) show simple single louver of the present invention in the closed, semi-open, and open positions, respectively.

FIGS. 11(a), 11(b), and 11(c) show sliders of the present invention, including movable mini louvers, in the closed, semi-open, and open positions, respectively.

FIGS. 12(a), 12(b), and 12(c) show bi-fold louvers of the present invention in the closed, semi-open, and open positions, respectively.

DESCRIPTION OF THE PREFERRED EMBODIMENTS

The contents of "MEMS Louvers for Thermal Control," J. L. Champion, R. Osiander, M. A. Garrison Darrin, and T. D. Swanson, $2^{nd}$ Conference on Integrated Micro/Nano Technology for Spacecraft Applications, Apr. 11–15, 1999 MNT99 Proceedings, pp. 233–241, 1999, are incorporated herein by reference.

The MEMS louvers of the present invention are similar in function to conventional mechanical louvers but much smaller (a few hundred microns on a side) and offer other distinct advantages.

A variety of openings are possible for the MEMS louvers of the present invention. These include a simple single louver, a series of folding louvers, accordion type devices, linearly sliding devices, rotating sliding devices, and other arrangements.

Micro-electro-mechanical (MEMS) louvers of the present invention are similar to miniature venetian blinds that can be opened or closed to expose an underlying thermal control coating. The MEMS louvers of the present invention open/close to expose/hide an underlying surface. The louvers' outer surface preferably has a low emissivity, while the underlying surface has a high emissivity. The opposite approach is also clearly possible. Many thousands of miniature louvers (each being hundreds of microns on a side) would preferably be used; some or all of the louvers could be fully or partially opened to achieve the desired variable emissivity effect.

It is also be possible to use this MEMS louver concept to vary effective absorptivity in a manner analogous to that described for emissivity variation.

FIG. 1(a), 1(b), 2(a), 2(b), 3(a), and 3(b) show three embodiments of the MEMS louvers of the present invention.

Figure 1A:
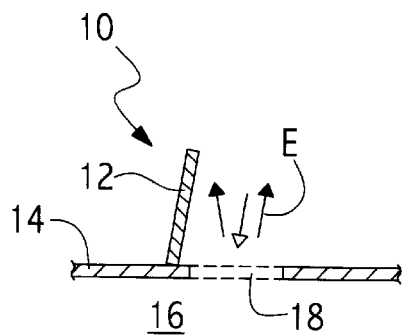
FIGS. 1(a) and 1(b) show a simple single louver of the present invention.
Figure 1B:
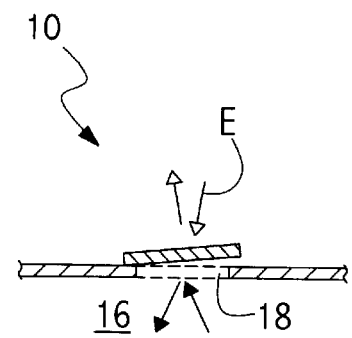

FIGS. 1(a) and 1(b) show a simple single louver 10 of the present invention. FIG. 1(a) shows the simple single louver 10 of the present invention in an open position, while FIG. 1(b) shows the simple single louver 10 of the present invention in a closed position.

As shown in FIGS. 1(a) and 1(b), the simple single louver 10 is the simplist design for the MEMS louvers of the present invention, and includes louvers 12 that are attached at their respective proximal ends to and can be opened against a stationary substrate 14 to a vertical position to expose an area of high emissivity substrate 16 to space.

Also as shown in FIG. 1(a), when the louver 12 is open, the energy E flows through the opening 18 to/from the high emissivity substrate 16. On the other hand, as shown in FIG. 1(b), when the louver 12 is closed, the energy E is prevented from flowing through to/from the high emissivity substrate 16 through 18.

Figure 2A:
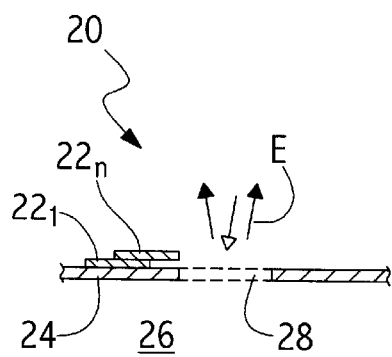
FIGS. 2(a) and 2(b) show a second embodiment of the present invention, stacking louvers (or sliders).
Figure 2B:
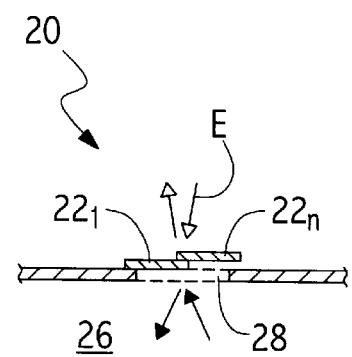

FIGS. 2(a) and 2(b) show a second embodiment of the present invention, stacking louvers (or sliders) 20. In the second embodiment of the present invention shown in FIGS. 2(a) and 2(b), multiple levels of louvers $22_1$–$22_n$ move across each other and either retract over a stationary substrate 24, thus allowing energy E to pass to high emissivity substrate 26 through opening 28. On the other hand, when louvers 22 are extended across opening 28, energy E is prevented by the louvers 22 from reaching substrate 26 through opening 28.

Using the louvers 22, the total area of the substrate 26 which can be exposed depends on the number, n, of layers of louvers 22 available in the fabrication process and is about (1⅟n) times the slider area. Advantages of this approach include a two-dimensional design, linear variability of exposed area, and possibly improved sturdiness of design.

As shown in FIGS. 2(a) and 2(b), louver $22_1$, is attached at one end, the proximal end of louver $22_1$, to stationary substrate 24, and at the other end, the distal end of louver $22_1$, to the next louver in sequence, in this case louver $22_n$. Louver $22_n$ is then attached at its proximal end to the distal end of louver $22_1$.

Figure 3A:
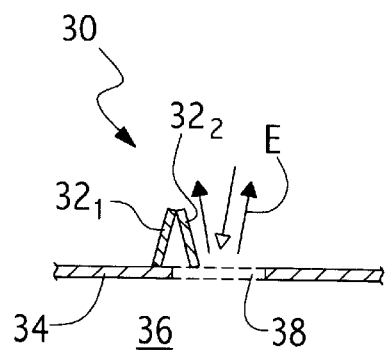
FIGS. 3(a) and 3(b) show a third embodiment of the present invention, bi-fold louvers.
Figure 3B:
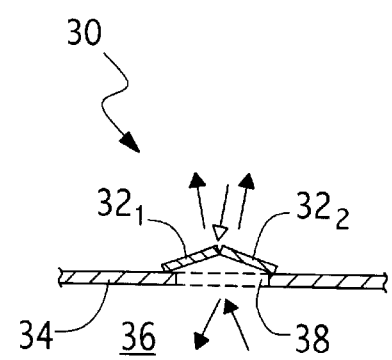

A third embodiment of the MEMS louvers of the present invention, shows in FIGS. 3(a) and 3(b), mimics a bi-fold door and is more complicated than the foregoing first and second embodiments since the third embodiment uses more hinges (not shown in FIGS. 1(a) through 3(b)). However, the third embodiment may be more rugged than the single louvers 20 while providing approximately the same active area.

As shown in FIGS. 3(a) and 3(b), louvers $32_1$–$32_2$ move in accordion fashion to cover or retract from opening 38. Louver $32_1$ is attached at one end, its proximal end, to stationary substrate 34 and at the other end, its distal end, to one end (the proximal end) of louver $32_2$. When louvers 32 are retracted, energy E flows to/from substrate 36 through opening 38, and when louvers 32 are extended, energy E is prevented by the louvers 32 from exchanging with substrate 36.

Figure 4:
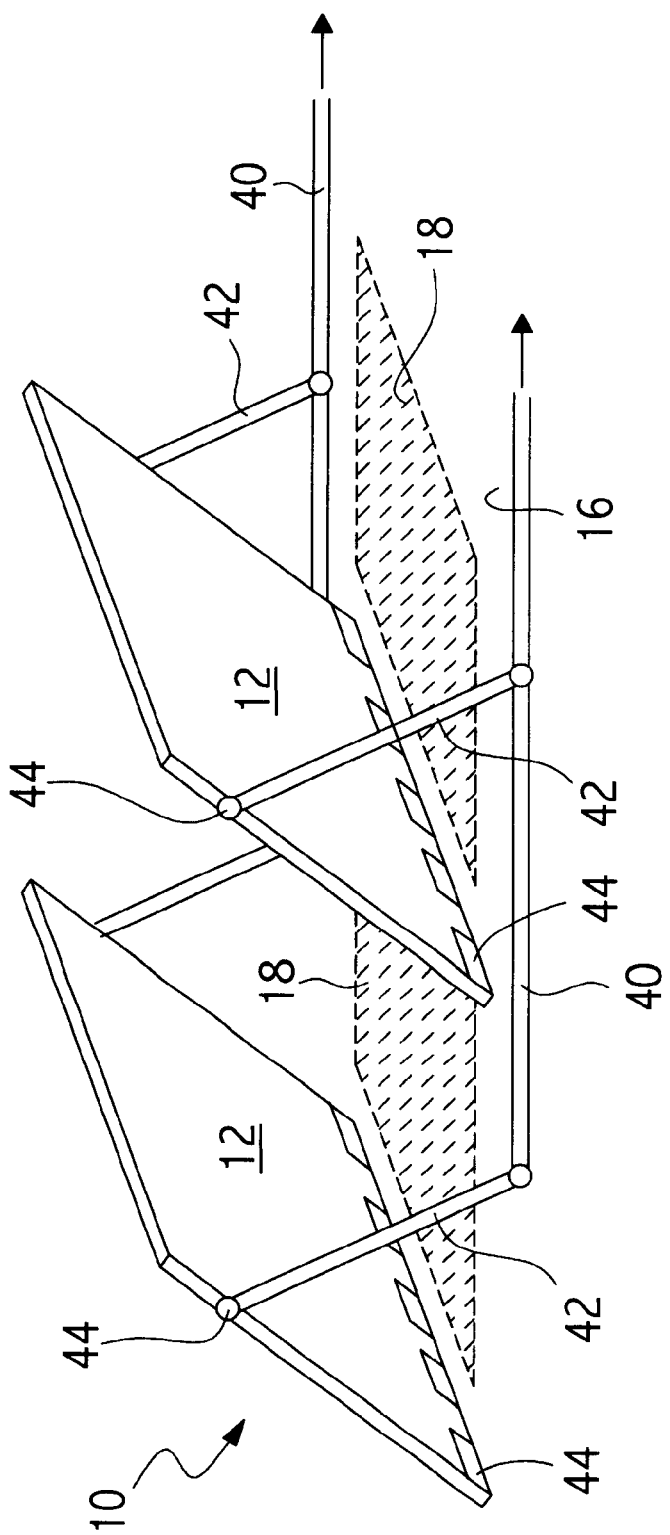
FIG. 4 shows a detailed diagram of the simple single louver of the present invention shown in FIGS. 1(a) and 1(b).

FIG. 4 shows a detailed diagram of the simple single louver 10 of the present invention shown in FIGS. 1A and 1B.

As shown in FIG. 4, a simple single louver 10 includes a repeating pattern of louvers 12, each attached near its respective distal end to a vertical actuator arm 42 by hinge 44 located near the distal end of the louver 12, and to substrate 16 by hinge 42 at its respective proximal end of the louver 12. The other side of actuator arm 42 is attached to horizontal actuator arm 40 which, in turn is attached to actuators (not shown in FIG. 4).

When horizontal actuator arm 40 is retracted toward the actuator, the louvers 12 are closed over opening 18, thus preventing emissivity through opening 18. The side opposite to the substrate 16, the top side, of each louver 12 is coded with vapor deposited (VD) gold. The typical louver 12 is on the order of hundreds of microns by hundreds of microns in size.

Also as shown in FIG. 4, opening 18 is optional to expose the emissive surface 16 below. For certain types of materials of surface 16, opening 18 is not necessary to be etched because the infared energy will flow through it (e.g., silicon). However, it may be desirable to etch a hole for other reasons.

Figure 5:
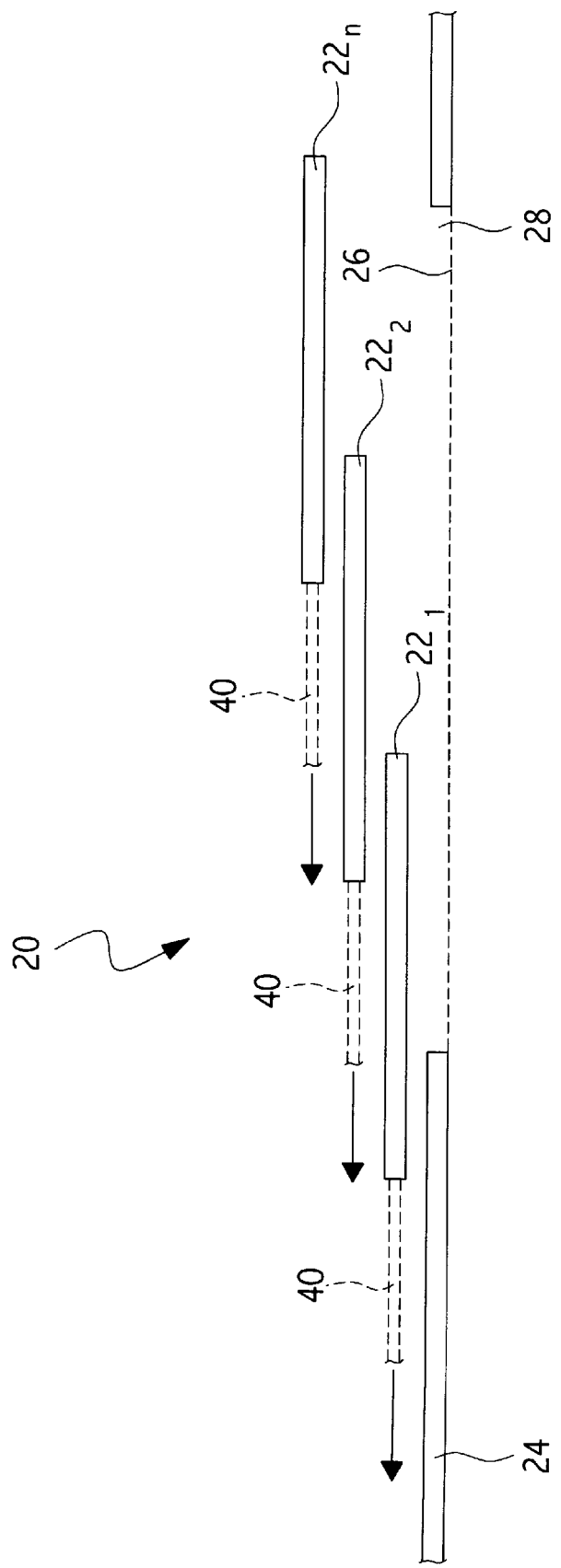
FIG. 5 shows a detailed diagram of the stacking louvers of the present invention shown in FIGS. 2(a) and 2(b).

FIG. 5 shows a detailed diagram of the stacking louvers (or sliders) 20 of the present invention.

As shown in FIG. 5, the sliders 20 comprise movable mini-louvers $22_1$ $22_2$ . . . , $22_n$, each attached at their respective proximal ends to actuators (not shown in FIG. 5) through actuator arms 40.

The side opposite to substrate 26, the top side, of each movable mini-louver 22 is coated with a low emissivity material such as gold, and the other side (the bottom side) slides against the next prior louver 22 to either expose opening 28 to substrate 26, or to hide substrate 26. The distal end of movable mini-louver $22_1$ attached to stationary substrate 24. This is accomplished by moving long arms that are attached to the corners of the louvers. Each louver would be fabricated on a different layer of the device.

Figure 6:
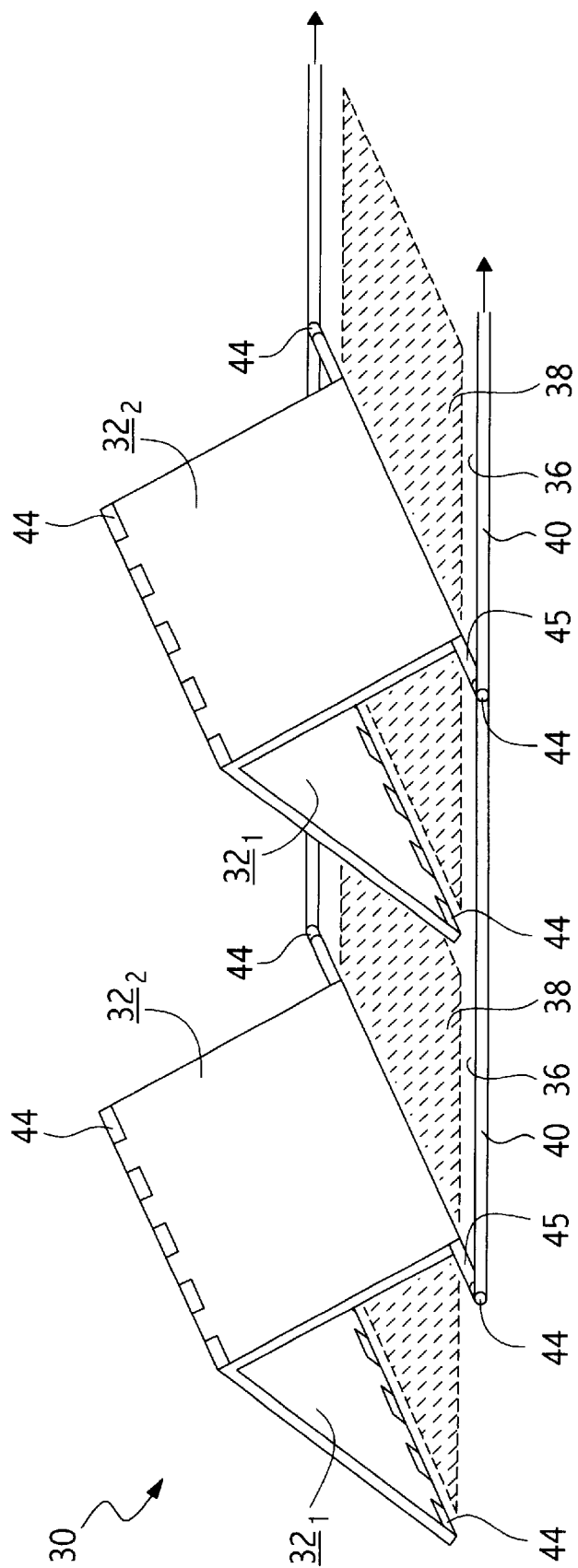
FIG. 6 shows a detailed diagram of the bi-fold louvers shown in FIGS. 3(a) and 3(b).

FIG. 6 shows bi-fold louvers 30 of the present invention. As shown in FIG. 6, the bi-fold louvers 30 comprise repeating patterns of groups of miniature folding louvers $32_1$ and $32_2$ attached at the proximal end of miniature folding louver $32_1$ by hinge 44 to a horizontal actuator arm 45. The distal end of miniature folding louver $32_1$ is attached by hinge 44 to the proximal end of miniature folding louver $32_2$. The distal end of miniature folding louver $32_2$ is attached by hinge 44 to horizontal actuator arm 45.

Horizontal actuator arm 45 is attached through hinge 44 to actuator arm 40, which is attached to an actuator (not shown in FIG. 6).

When actuator arm 40 is retracted by the actuator, the groups of miniature folding louvers $32_1$ and $32_2$ close over opening 38 to shield substrate 36. The side opposite to substrate 36, the top side, of each of miniature folding louver 32 is coated in gold CV. Thus, when closed over opening 38, the miniature folding louvers $32_1$ and $32_2$ prevent emissivity from passing from substrate 36 through opening 38.

On the other hand, when the groups of miniature folding louvers $32_1$ and $32_2$ are opened (actuator arm 40 is extended by the actuator), then substrate 36 is exposed, and energy E passes from substrate 36 through opening 38 or vice versa.

Figure 7:
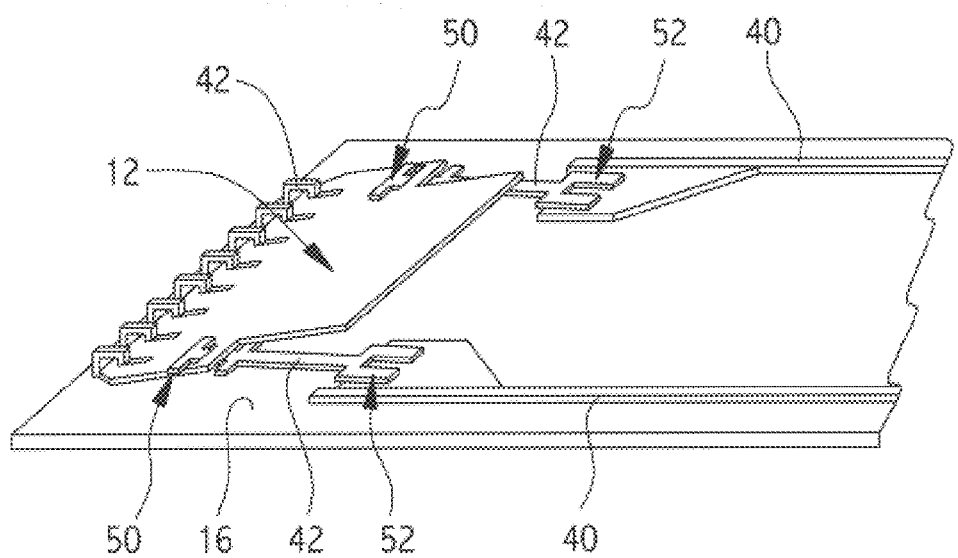
FIG. 7 shows a simple single louver of the present invention partially opened over an opening, thus partially exposing a substrate.

FIG. 7 shows a simple single louver 10 partially opened over opening 18, thus partially exposing substrate 16. As shown in FIG. 7, actuator arm 40 is coupled to vertical actuator 42 through hinge assembly 52. Vertical actuator arm 42 is coupled to louver 12 through hinge assembly 50.

Figure 8:
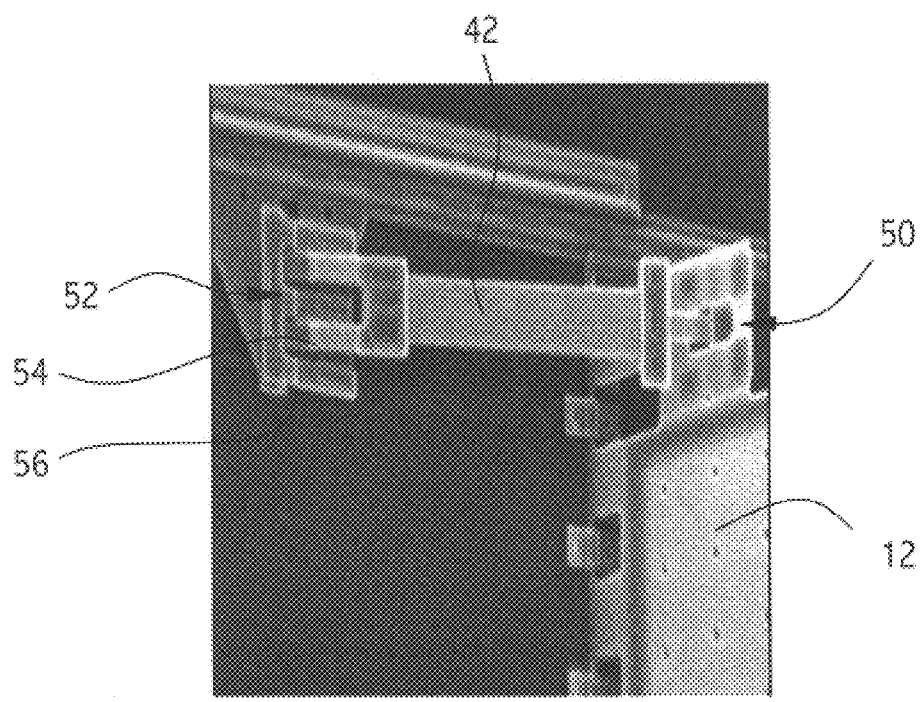
FIG. 8 shows a detailed diagram of hinge assemblies coupled on each side of a vertical actuator arm in the MEMS louvers of the present invention.

FIG. 8 shows a detailed diagram of hinge assembly 50 and hinge assembly 52, each of which is coupled to vertical actuator arm 42. As shown in FIG. 8, vertical actuator arm 42 couples to hinge assembly 52 through a 2-prong apparatus 54 coupling to plate 56. Moreover, vertical actuator arm 42 couples to louver 12 through hinge assembly 50, as shown in FIG. 8). Hinge assemblies 50 and 52 as shown correspond to hook-like devices for a 2-layer MEMS louver and can be identified in rapidly-evolving MEMS design catalogs. Preferably, for 4–5 layer MEMS louvers, the hinge design would be more representative of a true hinge.

Figure 9A:
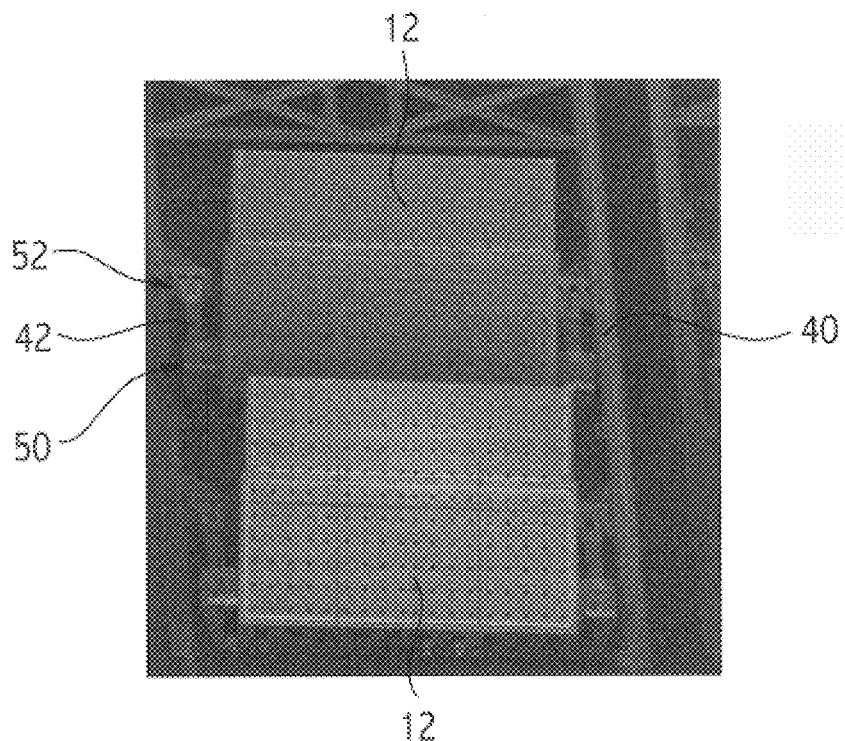
FIGS. 9(a) and 9(b) show louvers of the present invention in their semi-open (FIG. 9(a)) and open (FIG. 9(b)) positions.
Figure 9B:
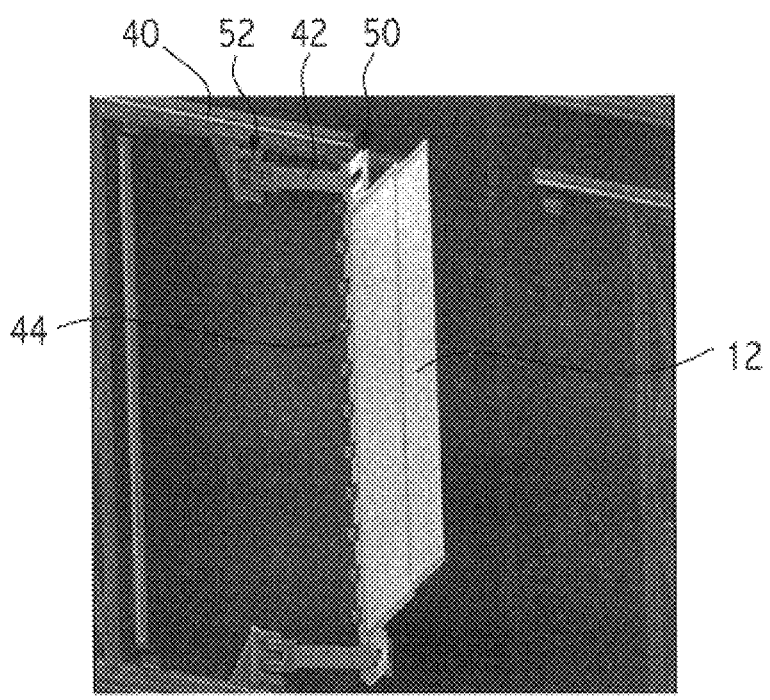

FIGS. 9(a) and 9(b) show louvers 12 in their semi-open (FIG. 9(a)) and open (FIG. 9(b)) positions. The width of each louver 12 shown in FIGS. 9(a) and 9(b) is preferably 500 micrometers.

As shown in FIGS. 9(a) and 9(b), actuator arm 40 either extends (FIG. 9(b)) or retracts (FIG. 9(a)), to open (FIG. 9(b)) or semi-close (FIG. 9(a)) louvers 12, through the action of hinge assemblies 52 and 50 and vertical actuator arm 42, as previously described.

FIGS. 10(a), 10(b), and 10(c) show simple single louver assembly 10, including louver 12, in the closed, semi-open, and open positions, respectively.

Likewise, FIGS. 11(a), 11(b), and 11(c) show sliders 20, including movable mini louvers 22, in the closed, semi-open, and open positions, respectively, exposing none, some, or all of opening 28, respectively.

In addition, FIGS. 12(a), 12(b), and 12(c) show bi-fold louvers 30, including miniature folding louvers 32 in the closed, semi-open, and open positions, respectively, exposing none, part of, or all of opening 38.

Figure 13:
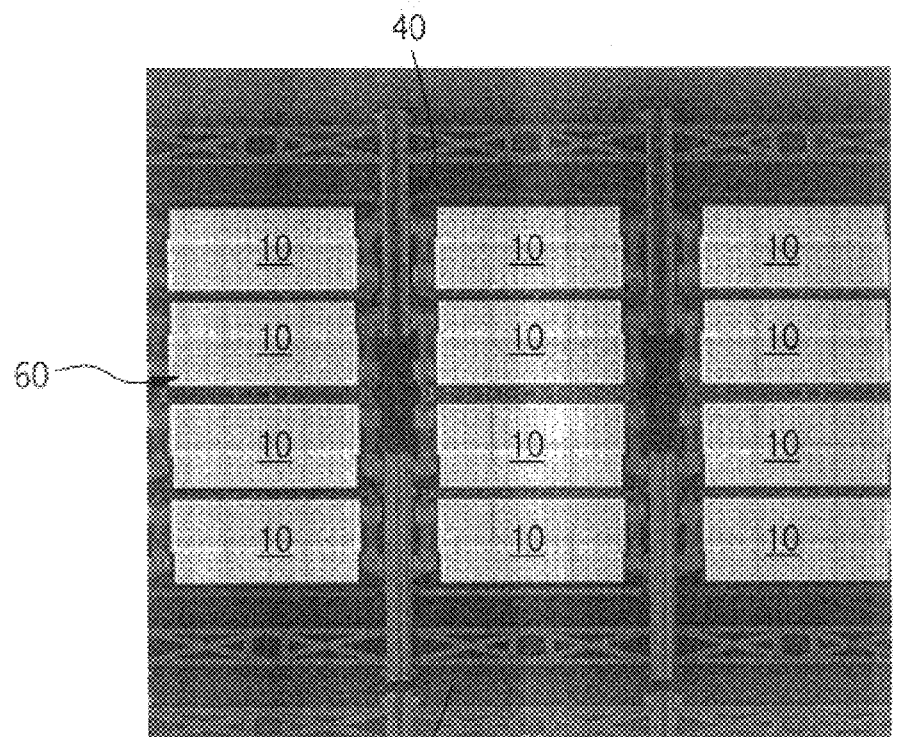
FIG. 13 shows an array of MEMS louvers of the present invention with manual actuation through actuation arms, grouped in sets of 2 each.

FIG. 13 shows an array 60 of MEMS louvers 10 with manual actuation through actuation arms 40, grouped in sets of 2 each.

Figure 14:
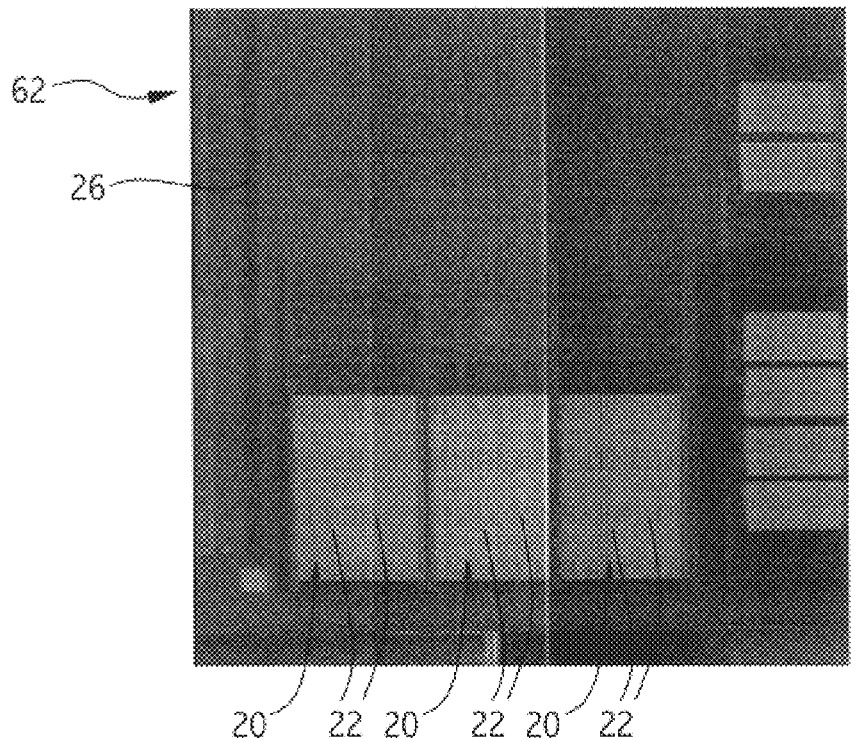
FIG. 14 shows a slider array of the present invention, with each movable mini louver being 0.5 by 0.7 micrometers exposing/hiding substrate 26.

FIG. 14 shows a slider array 62 in comprising sliders 20, with each movable mini louver 22 being 0.5 by 0.7 micrometers exposing/hiding substrate 26.

Figure 15:
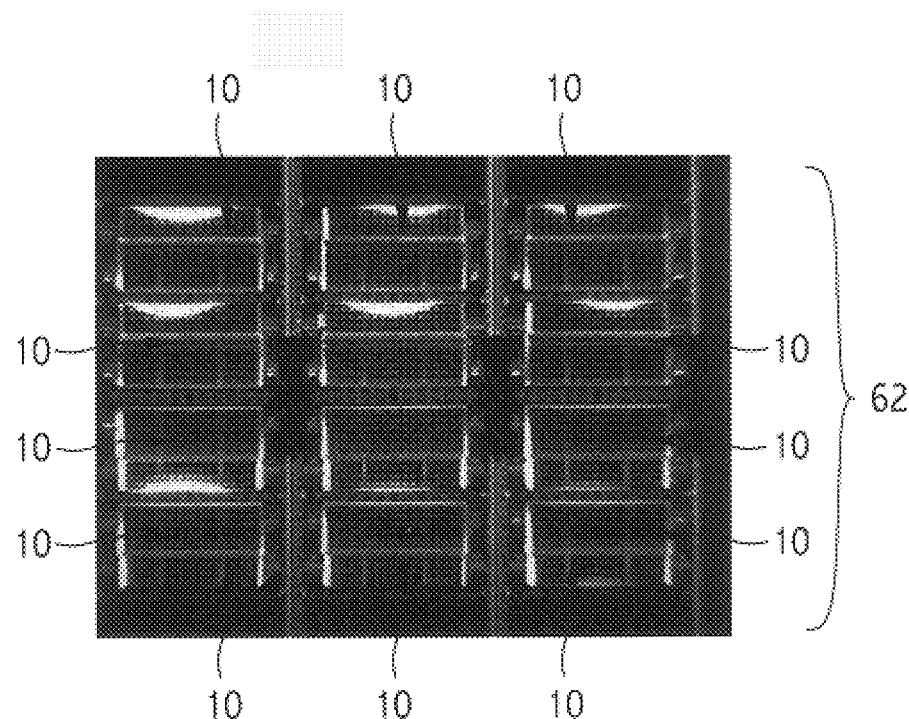
FIG. 15 shows an array of simple single louvers of the present invention, all of which are closed.
Figure 16:
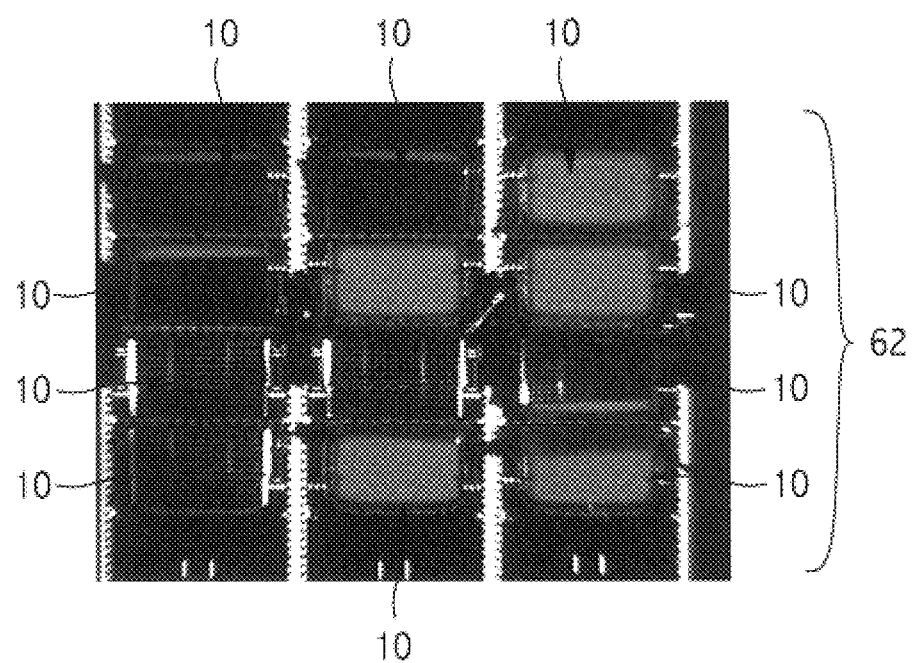
FIG. 16 shows an array of simple single louvers of the present invention, some of which are open (FIG. 16).

FIGS. 15 and 16 show an array 62 of simple single louvers 10, all of which are closed (FIG. 15), and some of which are open (FIG. 16).

FIGS. 13–16 show the MEMS louvers of the present invention arranged as discussed herein above on silicon chips/wafers.

Figures 17A, 17B, 17C:
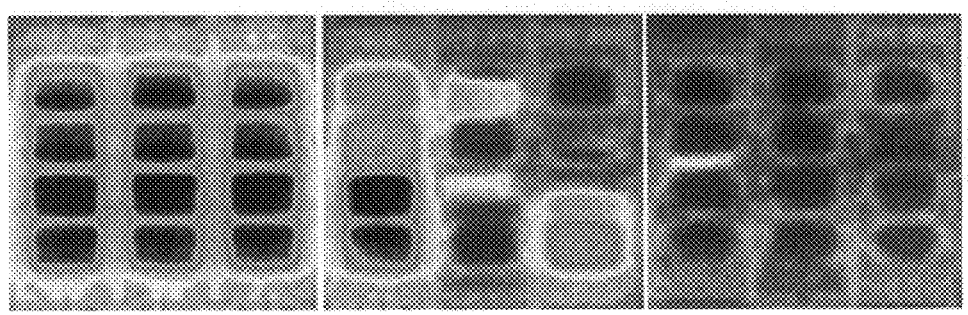
FIGS. 17(a), 17(b), and 17(c) show emissivity of a louver array of the present invention on a radiator at 40EC with all louvers closed (FIG. 17(a)), partially open (FIG. 17(b)), and all open (FIG. 17(c)).

FIGS. 17(a), 17(b), and 17(c) show emissivity of a louver array 64 on a radiator at 40EC with all louvers closed (FIG. 17(a), average emissivity $\epsilon$=0.5), partially open (FIG. 17(b), average emissivity $\epsilon$=0.7), and all open (FIG. 17(c), average emissivity $\epsilon$=0.88).

Figure 17D:
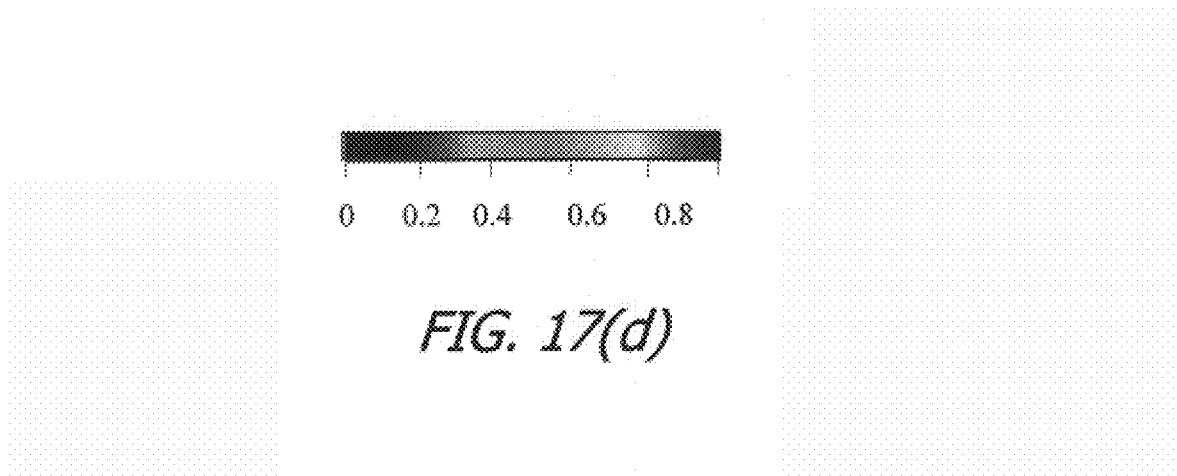
FIG. 17(d) is a key to the emissivity shown in FIGS. 17(a) through 17(c).

FIG. 17(d) is a key to the emissivity shown in FIG. 17(a) through 17(c).

Size

The size of the MEMS louver is variable, ranging preferably from a size of 500 microns by 200 microns to 500 micrometers on a side. However, they could be as small as a few 10's of microns on a side to perhaps a few thousand microns on a side. The MEMS louvers of the present invention preferably reside upon chips/wafers made of silicon or a similar substrate.

Grouping of Louvers

The above-mentioned MEMS louvers of the present invention may be grouped together, either in groups comprising a single type of louver shown in FIGS. 1(a)–3(b), or multiple types of louvers shown in FIGS. 1(a)–3(b). The groups may be small, in that several sets of louvers may be grouped together, in, for example, six dual sets of MEMS louvers. Also for example, three sliders of MEMS louvers may be placed next to each other, with each of the sliders being approximately 0.5×0.15 mm in size, each being gold coated and each having corrugated structures for support.

In addition, many thousands of MEMS louvers are preferably employed, covering an underlying, high emissivity surface, and forming a smart skin that adjusts in response to environmental influences over all or part of the spacecraft.

Material

Preferably, the MEMS louvers of the present invention include hinges, corrugated louver structures, and gold coating on the louvers.

The base material (substrates 16, 26, and shown herein above) for the MEMS louvers is generally silicon, while the louvers are also made of silicon and coated with a metal, preferably gold. Gold coated surfaces have a very low emissivity, with values of 0.02 to 0.03, as is indicated in many standard textbooks.

Modulating Emissivity

MEMS louvers modulate the effective emissivity of radiators on spacecraft. The MEMS louvers of the present invention are analogous to miniature windows that can be opened or closed to expose an underlying thermal control coating. The MEMS louvers of the present invention can be employed as a means of achieving a variable "effective emissivity", a variable "effective absorptivity", or both for thermal control purposes. In addition, in an entirely different application the MEMS louvers of the present invention can be used as a filter for infrared wavelengths.

The louvers are gold coated, having a low emissivity, while the underlying surface is of high emissivity. Since the base MEMS material, silicon, is transparent in the IR spectrum, the MEMS louvers of the present invention have a minimum emissivity when closed and a maximum emissivity when open and an underlying high emissivity surface is exposed.

The MEMS louvers of the present invention use the above-mentioned louvers, or hinged panels, in a manner such that heat emitted from the radiators over which the MEMS louvers of the present invention are placed is a function of louver angle—the wider the louvers are opened (the larger the louver angle), the more heat that the louvers allow to be emitted from the radiators. An electrostatic comb drive or other such actuator controls the louver position.

Many thousands of such miniature MEMS louvers of the present invention, distributed on silicon chip surfaces, would cover the underlying thermal control surface, which typically would be selected to have a high emittance. The "effective emittance" of the surface could thus be modulated in a controlled fashion by varying either the amount the MEMS louvers are opened or the total number of MEMS louvers that are completely opened, or both.

Also, the effective "emmissivity" of certain areas of a radiator could be controlled by modulating these MEMS louvers in that specific area. Since the base material the MEMS louvers are made of is typically silicon (which is transparent to infrared radiation), then hollowing of the area directly below the MEMS louver may be unnecessary. It may, however, be a useful technique for reducing reflectivity.

The emittance variability is proportional to the difference in area-coverage of the open and closed louver. This may be on the order of 80%, which allows emissivity-variations between 0.1 and 0.9.

Actuation

Highly individual louver control provides the best accuracy in setting the emissivity and further allows increased control of the spatial emissivity variations.

The MEMS louvers of the present invention can be actuated actively by remote control or passively using smart feedback such as bi-morph devices. Alternatively, the MEMS louvers can be manually actuated.

For a successful application of MEMS louvers for spacecraft thermal control, an actuation mechanism allowing the highest individual louver control possible with a minimum of space occupied is desirable. The area covered by the actuator presents an emissivity bias. Highly individual louver control provides the best accuracy in setting the emissivity and further allows increased control of the spatial emissivity variations and operational redundancy. In addition, low power consumption and zero power in a static condition are highly desirable for small spacecraft applications.

A variety of actuator mechanisms are possible for use with the MEMS louvers of the present invention. Some, such as the traditional MEMS electrostatic "comb" actuator (which is well-known in the art), are active while others, such as a bi-metallic device or simple "U" shaped lever arm, could be actuated passively by thermal effects.

One of the above-mentioned actuation mechanisms is an electrostatic comb drive. While this is a low power, reliable and straight-forward designed MEMS actuation mechanism, disadvantages arise due to the relatively large area requirement and from a spacecraft perspective, relatively high driving voltages. In addition, static charging of the surface from space radiation could be an issue as this may interfere with a control signal.

Another mechanism is a "heatuator" (Butler, J. T., Bright, V. M., and Cowan, W. D., "Average power control and positioning of polysilicon thermal acuators", Sensors and Actuators 72, 1999, pp88–97.), which does not have the high voltage requirement but still takes up a lot of area on the louver chip.

Both actuation mechanisms are known in the art and are solutions where the actuation devices could be placed outside of the active area above the radiator, but in this case individual control of the louvers will be difficult.

Another actuation mechanism involves coating of the actuation structures with a metal different than gold to create a bi-morph, which can is heated electrically to generate actuation in connection with the change due to different thermal expansion. Such an actuation mechanism could be used in a smart way, where the surface temperature directly controls the louver actuation.

Similar in function could be the use of shape memory alloy coatings such as Titanol for the actuators. Also similarly, other actuation techniques which involve thermal expansion, including paraffin actuators, bimetallics or shape-memory alloys such as NITANOL (Seguin, J. L., Bendahan, M., Isalgue, A., Esteve-Cano, V., Carchano, m H., and Torra, V., "Low temperature crystallized Ti-rich NiTi shape memory alloy films for microactuators" Sensors and Actuators 74, 1999, pp. 65–69).

Environmental Requirements

The MEMS louvers of the present invention offer the possibility of substituting the smaller, lighter weight, more rugged, and less costly MEMS louvers for traditional, mechanical louvers, variable conductance heat pipes, or make-up electrical heaters.

The MEMS louvers of the present invention must survive through the launch and operate in the harsh environment of space. In addition, the effects of pre-launch storage must also be taken into consideration. A non-exhaustive list of the of MEMS reliability concerns includes: stiction, ground contamination, ground handling, fatigue including radiation, wear, and vibrational induced loading.

Prototype MEMS louvers have been developed clearly demonstrating the feasibility of using arrays of devices for miniaturized satellite thermal control. Successful actuation of the initial MEMS louvers and the results of preliminary emissivity testing indicated the validity of the hinged louver concept for thermal control applications.

Fabrication

As solid state devices made of a very inexpensive base material in an automated manufacturing process, the MEMS louvers (10, 20, and 30) can be produced inexpensively.

Typically, the base material (16, 26, and 36) for the MEMS louvers (10, 20, and 30, respectively) is silicon while each louver ((12, 22, and 32, respectively) is also silicon but coated with a metal such as gold, which has a very low emissivity.

Preferably, the louvers (12, 22, and 32, respectively) are coated in gold, providing a very low emissivity $\epsilon$ of 0.02 to 0.03. To prevent bending from residual stress after the gold coating is applied to the louvers (12, 22, and 32), the louvers are preferably coated in small, non-overlapping 20×20 micrometer areas. Bending can be further reduced by thinning the gold coating to 100 nm and/or increasing the thickness of the underlying material.

The silicon substrate (16, 26, and 36) under the louvers may be removed (preferably) or left in place. If the silicon substrate (16, 26, and 36) is removed, the silicon substrate under the louvers is removed using a deep reactive ion etching (DRIE) technique.

Although transparent at the near infared wavelengths of interest, the silicon substrate (16, 26, and 36) itself used for support of the MEMS louvers is not suitable as a radiative surface due to its low emissivity and high reflectivity. Hence, after removal of the silicon substrate (16, 26, and 36) by etchant during post processing, the MEMS louvers (10, 20, and 30, respectively) are placed on a surface suitable for radiative heat loss such as a traditional white paint.

Applications and Benefits

The MEMS louvers of the present invention offer numerous unique advantages for thermal control. While related to the traditional, much larger mechanical louvers, the MEMS louvers of the present invention can not only replace such mechanical louvers for large applications but are uniquely suitable for small, micro, or nano spacecraft where all the other more traditional thermal control techniques would be too bulky.

Several orders of magnitude size, weight, and volume decreases are potentially achieved using micro-electromechanical techniques. The use of this technology offers substantial benefits in spacecraft/instrument design, integration and testing, and flight operations.

MEMS louvers of the present invention will be particularly beneficial for the emerging smaller spacecraft and instruments of the future. In addition, this MEMS thermal louver technology can form the basis for related spacecraft/instrument applications.

Further, low power consumption and zero power in a static condition which these devices can achieve are required for small spacecraft applications.

In addition, selective reflectivity is achievable by varying the type of coatings on the MEMS louvers, the size of the MEMS louvers, and their orientation.

The small feature sizes make the MEMS louvers of the present invention compatible with miniature spacecraft.

Moreover, a wide range of "effective emissivity" can be obtained from either active or passive control techniques using the MEMS louvers of the present invention. In addition, a wide variety of "effective emissivity" and "effective absorptivity" values could be obtained from different selections of top coatings and substrates for the MEMS louvers of the present invention.

The ability to vary the effective emissivity and or absorptivity of a thermal control surface has tremendous applicability to a variety of spacecraft and instrument applications. All spacecraft, NASA, NOAA, DOD, and commercial, require effective thermal control.

Additionally, by varying the "effective emissivity" of a spacecraft, certain stealth benefits would be achieved for military applications. Objects with low emissivity are much more difficult to detect with infared sensors.

Moreover, the MEMS louvers of the present invention are generically useful for all spacecraft and especially smaller spacecraft where traditional techniques are too bulky.

Further, the control capability afforded by the MEMS louvers of the present invention offers tremendous advantages by simplifying the design effort, by simplifying the integration and testing process and also by offering the ability to adapt to changing thermal loads and/or thermal sinks once launched.

Through the use of passive controllers or a simple active controller, the spacecraft could be made to be thermally adaptive to its load and environment using the MEMS louvers of the present invention.

Numerous NASA missions, such as the ST5 Nanosat Trailblazer Constellation, will undergo significant changes in its thermal environment and will require means of modulation in the spacecraft's heat rejection rate. For representative applications, Heater power savings are predicted to be 50 to 90%, with a nearly 4:1 reduction in component temperature variations using the MEMS louvers of the present invention.

In addition to the obvious weight and power savings, the technology of MEMS louvers for thermal control would greatly simplify spacecraft design and qualification testing and also allow adaptive response to changing power levels or unexpected thermal environments once on-orbit.

Moreover, a related application of the MEMS louvers of the present invention is as selective filters in the infrared region of the spectrum. This could be achieved by creating openings that were just large enough to let in a maximum size infrared wavelength. By having a series of different size openings, it is possible to select the maximum wavelength that can pass through the device. This could be accomplished in at least two fashions: by varying the width that a sliding type louver is open or by simply opening louvers of different sizes. MEMS louvers can be made as small as a few microns on a side.

Further, the MEMS louvers of the present invention are very rugged and would survive the space and launch environment. As discrete devices which act together to achieve a bulk function, any deterioration would occur individually, thus leading to a gradual deterioration of function of the bulk device.

In addition, by varying the direction the opening louver faces, or by using a sliding type louver, the "effective emissivity" of the bulk surface can be made to be independent of the sun angle. This significantly simplifies the analytical effort.

The application of MEMS technology to provide variable thermal control provides numerous advantages.

The present invention has been described with respect to spacecraft. Other applications might be for military stealth devices or for sensors for various ground applications.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   a substrate;
      a MEMS louver coupled to the substrate and selectively opening and closing to expose and hide the substrate;
   first hinges coupled to the MEMS louver;
      a pair of vertical actuator arms coupled to the MEMS louver by the first hinges and in parallel with each other;
   second hinges coupled to the vertical actuator arms;
   horizontal actuator arms coupled to the second hinges and in parallel with each other, wherein the horizontal actuator arms extend and retract to close and open the MEMS louver.

2. The apparatus as in claim 1, wherein the MEMS louver comprises a group of single louvers each coupled to the substrate, to respective vertical actuator arms, and to the horizontal actuator arms.

3. The apparatus as in claim 1, wherein the MEMS louver comprises a louver ranging from tens of microns to a few thousand microns on a side.

4. The apparatus as in claim 1, wherein the louver is coated on one side thereof with a low emissivity material.

5. An apparatus comprising:
   a substrate;
   actuator arms; and
   MEMS louvers comprising stacking louvers, each one of which is coupled to a respective one of the actuator arms, wherein said stacking louvers comprise movable mini-louvers attached at each, respective proximal end to respective actuator arms, each of said mini-louvers being stacked successively on top of each other and being successively extended in a horizontal direction over the substrate by the respective actuator arms.

6. The apparatus as in claim 5, wherein each of the mini-louvers is coated on one side thereof with a low emissivity material.

7. The apparatus as in claim 5, each of the mini-louvers being from a few tens to thousands of microns on a side.

8. An apparatus comprising:
   a substrate;

a first hinge coupled to the substrate;

first actuator arms in parallel with each other;

second actuator arms in parallel with each other and perpendicular to the first actuator arms;

a second hinge; and

MEMS louvers comprising bi-fold louvers, said bi-fold louvers comprising sets of two louvers, a first one of which is coupled to the first hinge at a proximal end thereof and to a second one of the set of two louvers at a distal end of the first one, the second one of which is coupled to the first one at a proximal end of the second one by the second hinge and to the first actuator arm at a distal end thereof, wherein the sets of bi-fold louvers are opened and closed by the extension and retraction of the second actuator arms.

9. The apparatus as in claim 8, wherein the louvers are coated on one surface thereof with a low emissivity material.

10. The apparatus as in claim 9, wherein the louvers are from a few tens to thousands of microns on a side.

\* \* \* \* \*